US006498919B2

(12) United States Patent
Okabayashi

(10) Patent No.: US 6,498,919 B2
(45) Date of Patent: Dec. 24, 2002

(54) HIGH FATIGUE RESISTANT METAL SHEET AND FIXING BELT AND FIXING APPARATUS USING THE SAME AND EVALUATION APPARATUS OF METAL MATERIAL FATIGUE RESISTANCE AND METHOD THEREOF

(75) Inventor: Eiji Okabayashi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 41 days.

(21) Appl. No.: 09/812,594

(22) Filed: Mar. 21, 2001

(65) Prior Publication Data

US 2001/0036378 A1 Nov. 1, 2001

(30) Foreign Application Priority Data

Mar. 30, 2000 (JP) ....................................... 2000-095053

(51) Int. Cl.[7] ........................... G03G 15/20; G01N 3/32
(52) U.S. Cl. .......................... 399/329; 79/808; 399/328; 399/330
(58) Field of Search ................................. 399/328, 329, 399/330; 73/799, 763, 806, 808, 810, 813

(56) References Cited

U.S. PATENT DOCUMENTS

| | | | | |
|---|---|---|---|---|
| 4,791,882 A | | 12/1988 | Enoguchi et al. | |
| 5,752,148 A | | 5/1998 | Yoneda et al. | |
| 5,758,245 A | | 5/1998 | Matsuura et al. | |
| 5,832,353 A | | 11/1998 | Sano | |
| 5,857,136 A | | 1/1999 | Yoneda et al. | |
| 5,873,020 A | | 2/1999 | Matsuura et al. | |
| 6,026,691 A | * | 2/2000 | Laird et al. | 73/808 |
| 6,152,969 A | * | 11/2000 | Miller et al. | 73/808 |

* cited by examiner

*Primary Examiner*—Hoang Ngo
(74) *Attorney, Agent, or Firm*—Morrison & Foerster LLP

(57) ABSTRACT

A metal sheet showing either voltage characteristics, impedance or calorific characteristics close to the case where low frequency is applied even when a high frequency alternating current voltage is applied. This metal sheet presents a good movement of displacement and less starting points of cracking, because of its good crystallinity (good mobility of conductive electrons). Therefore, it is hardly destroyed under the repeated deformation. In short, it presents a high fatigue resistance against repetitive deformation. Therefore, this metal sheet is suited for a fixing belt and a fixing apparatus. The evaluation of fatigue resistance using this can be realized by comparing voltage characteristics, impedance, or calorific characteristics when high and low frequency alternating current voltages are applied to a test piece.

16 Claims, 12 Drawing Sheets

HIGH FATIGUE RESISTANT METAL SHEET AND FIXING BELT AND FIXING APPARATUS USING THE SAME AND EVALUATION APPARATUS OF METAL MATERIAL FATIGUE RESISTANCE AND METHOD THEREOF

This application is based on Application No. 2000-95053 filed in Japan, contents of which is hereby incorporated by reference.

BACKGROUND OF THE INVENTION

1. Field of The Invention

The present invention relates to a sheet shape metal material used for a fixing belt or the like in an image forming apparatus using toner and a fixing belt and a fixing apparatus using the same. More particularly, it concerns a metal sheet presenting a high fatigue resistance against repeated deformation and a fixing belt, a fixing apparatus, and further an evaluation of fatigue resistance of metal material for this purpose.

2. Description of Related Art

As an example of application where the metal sheet is subjected to a repeated deformation, a fixing belt in an image forming apparatus of belt fixing type can be cited. Namely, the fixing belt has an endless loop form, but curls in the opposite direction at the point of fixing nip, being pinched by two rollers. As the result, the respective portions of the fixing belt are repeatedly deformed by rotation. In general, conventionally, as the fixing belt material, electrocast nickel foil is often used as base material, coated with a releasing layer of silicone rubber or the like on one side.

However, in the typical fixing belt of the related art, the fatigue resistance against a repetitive deformation was not necessarily sufficient. Consequently, in a long use, it broke due to the metal fatigue, and could not meet the target life. Particularly, this tendency is evident for a higher paper advancing speed or for a wide size paper. To solve this, it has been devised to increase the base material hardness, or to adopt a two-layered structure with metals of different hardness. However, the former did not prove to be an effective measure, because the nip pressure had to be increased accordingly. The latter has increased the cost because of complicated manufacturing process, and presented the problem of the presence of many factors affecting quality variation.

SUMMARY OF THE INVENTION

The present invention has been achieved in view of the aforementioned problems of the related art. In short, it is an object of the present invention to provide a metal sheet having a high fatigue resistance against repeated deformation and a fixing belt and a fixing apparatus using the same. Also, it is another object of the invention to provide an evaluation apparatus of fatigue resistance of metal material and a method thereof.

A flexible metal sheet with high fatigue resistance of the present invention devised in order to solve this problem is a flexible sheet member satisfying at least one of the following three expressions:

$$0.7 < I_H/I_L \leqq 1 \quad (1)$$

$$0.25 < Z_L/Z_H \leqq 1 \quad (2)$$

$$0.7 < Q_H/Q_L \leqq 1 \quad (3)$$

for effective value of current density, impedance and calorific power, respectively when two alternating voltages of the same effective voltage value and different in frequency, namely a low frequency first alternating voltage and a high frequency second alternating voltage are applied. It is needless to say that it is better that all three expressions are satisfied. Here, I, Z, and Q represent effective value of current density, impedance and calorific power, respectively. Suffixes H and L represent high frequency (second alternating voltage) application and low frequency (first alternating voltage) application, respectively.

The inventor has studied diligently to find an evident correlation between the voltage-current characteristics against high frequency and the fatigue resistance of metal material. That is, a metal material showing voltage-current characteristics against a high frequency comparable to that against a low frequency tends to show a higher fatigue resistance. On the contrary, a metal material showing voltage-current characteristics against a high frequency inferior to that against a low frequency tends to show a lower fatigue resistance. Therefore, the fatigue resistance level of metal material can be judged by comparing voltage-current characteristics against high frequency and low frequency. Further, if at least one of the aforementioned three relations is satisfied, it can be said to be excellent as high fatigue resistance metal sheet. Note that in this Application, "metal" includes alloyed metals. A representative example of high fatigue resistance metal sheet of the present invention is an electrocast nickel of 100 μm or less in thickness, manufactured under predetermined electrocasting conditions.

As for the reason of such correlation between the high frequency characteristics and the fatigue resistance, the inventor presumes as follows. Namely, bad frequency characteristics mean that the mobility of conduction electrons in the metal crystal is low under the high frequency. This is supposed to be provoked by the presence of many factors impeding the movement of conduction electrons, such as many lattice defects or impurities, or irregular crystalline granularity. These factors are also factors impeding movement of displacement during the deformation, and they are also supposed to act as starting points of cracking. Therefore, those bad in high frequency characteristics are low in fatigue resistance, and those good in high frequency characteristics are also good in fatigue resistance. Besides, the alternating voltage may be direct current on and off, an alternating current (whatever the waveform may be) is preferable, if it is possible. For the alternating current, as the polarity changes periodically, the crystalline quality is reflected on the high frequency characteristics more appropriately.

In addition, the fixing belt of the present invention includes an endless belt shape metal sheet and a releasing layer formed on the outer surface thereof, wherein the metal sheet satisfies at least one of the aforementioned relations. Moreover, the fixing apparatus of the present invention comprises a first roller, a second roller, a fixing belt including an endless belt shape metal sheet and a releasing layer formed on the outer surface thereof, and that is wound around the first roller and the second roller, and a third roller disposed in a way to be pressed against the first roller via the fixing belt, wherein the metal sheet satisfies at least one of the aforementioned relations.

Also, the evaluation apparatus of metal material fatigue resistance according to the present invention comprises a high frequency power source for applying an alternating voltage to a test piece, a current measuring instrument for measuring current through a test piece, and a controller for calculating the ratio of currents through a test piece when a plurality of alternating voltages of the same effective voltage value and different in frequency are applied to a test piece from the high frequency power source, and evaluating fatigue resistance of the test piece based on the calculation results thereof.

Moreover, the evaluation method of metal material fatigue resistance according to the present invention comprises the steps of: applying a plurality of alternating voltages of the same effective voltage value and different in frequency to the test piece and measuring the current through the test piece when each alternating voltage is applied; calculating the ratio of these currents; and evaluating fatigue resistance of the test piece based on the calculation results thereof.

In this evaluation apparatus and evaluation method, the fatigue resistance of the test piece as a whole is evaluated by comparing currents through the test piece in case of high frequency and that in case of low frequency. To be more specific, it is evaluated that the closer the current ratio is to 1 in the case of high frequency and in the case of low frequency, the higher is fatigue resistance of the test piece. Obviously, the impedance may be compared considering not only the current value, but also phase components.

Otherwise, the evaluation apparatus of metal material fatigue resistance according to another aspect the present invention comprises a high frequency power source for applying an alternating voltage to a test piece, a calorific power measuring instrument for measuring the calorific power at each point of a test piece, and a controller for comparing the calorific power of the same point of a test piece when a plurality of alternating voltages of the same effective voltage value and different in frequency are applied to a test piece from the high frequency power source, and evaluating fatigue resistance of the test piece based on the comparison results thereof.

Similarly, the evaluation method of metal material fatigue resistance according to another aspect of the present invention comprises the steps of: applying a plurality of alternating voltages of the same effective voltage value and different in frequency to the test piece and measuring the calorific power of the same point of the test piece when each alternating voltage is applied; comparing the measured calorific power; and evaluating the test piece fatigue resistance based on the comparison results.

In these cases, it is evaluated that the closer the calorific powers in the case of high frequency and in the case of low frequency are to each other, the higher is fatigue resistance at that point of the test piece. In these cases, further, not only the evaluation of the test piece as a whole but also the evaluation of a particular point is possible. Moreover, a two-dimensional evaluation of fatigue resistance in the test piece is also possible by performing the evaluation for a plurality of points.

Thus, according to the present invention, a metal sheet having a high fatigue resistance against repeated deformation and a fixing belt and a fixing apparatus using the same are provided. In addition, there are provided an evaluation apparatus of metal material fatigue resistance and a method thereof.

DETAILED DESCRIPTION OF THE PREFERRED EMBODIMENTS

Now embodiments realizing the present invention will be described in detail referring to the accompanying drawings. In this embodiment, a high fatigue resistance metal sheet of the present invention is applied to a fixing belt of a belt type fixing apparatus in an image forming apparatus using toner.

Figure 1:
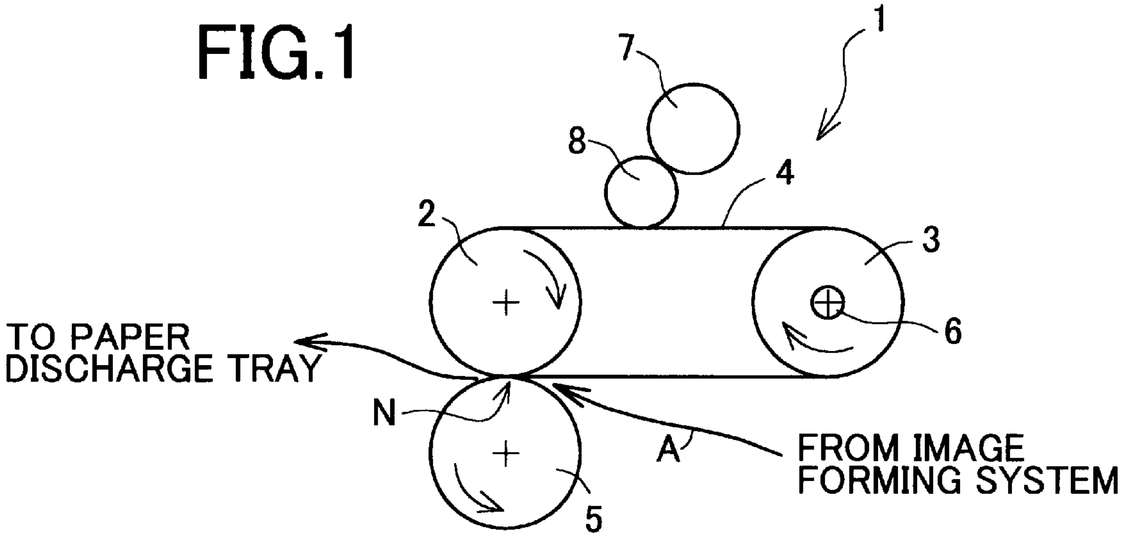
FIG. 1 is a schematic view of a belt type fixing apparatus.

A belt type fixing apparatus 1 according to this embodiment comprises, as shown in FIG. 1, a fixing roller 2, a heater roller 3, an endless fixing belt 4 wound around them, and an opposed roller 5. The fixing roller 2 is formed of sponge rubber, and forms a fixing nip N with the opposed roller 5 via the fixing belt 4. The heater roller 3 has a built-in heater 6 inside as fixing heat source, and pulls the fixing belt 4 taut with the fixing roller 2. The opposed roller 5, made of silicone rubber, is applied to the fixing roller 2 and the fixing belt 4 with a predetermined nip pressure. The belt type fixing apparatus 1 is further provided with an oil impregnated roller 7 and an oil application roller 8 at the outer surface side of the fixing belt 4, for supplying the outer surface of the fixing belt 4 with a constant amount of fixing oil.

Figure 2:
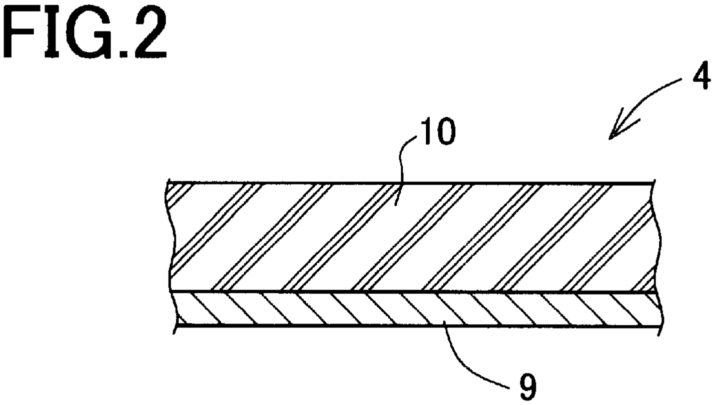
FIG. 2 is a cross-sectional view of a fixing belt.
Figure 3:
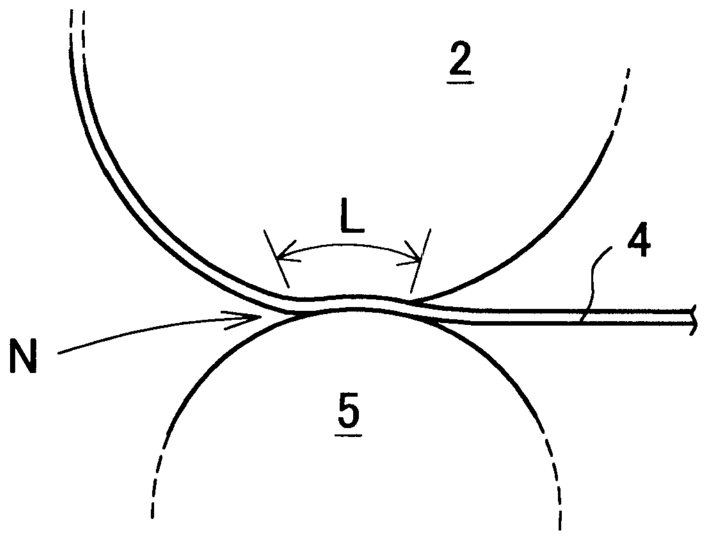
FIG. 3 is an enlarged cross section of a fixing nip of the belt type fixing apparatus.

As shown in the enlarged cross-section of FIG. 2, the fixing belt 4 is made of two layers with a base material 9 of 40 μm thick and a releasing layer 10 of 200 μm thick. The base material 9 is at the inner surface side and the releasing layer 10 at the outer surface side. The base material 9 is made of electrocast nickel foil, while the releasing layer 10 is made of silicone rubber. At the fixing nip N, as shown in the enlarged view of FIG. 3, there is a section L where the fixing belt 4 is curved to the opposite side, by the contact pressure between the fixing roller 2 and the opposed roller 5. Consequently, when the fixing belt 4 runs, the respective parts thereof are repeatedly deformed by passing through the section L. However, the life of the fixing belt 4 is sufficiently long, because the belt type fixing apparatus 1 uses a high fatigue resistance base metal 9 as described below.

In such a belt type fixing apparatus 1, a printing paper which has received a toner image in an image forming system is fed into the fixing nip N as shown by the arrow A in FIG. 1. At the fixing nip N, the printing paper passes between the fixing belt 4 and the opposed roller 5. Here, the toner image is fixed on the printing paper by heat and pressure. Heat for this purpose is conducted from the heater roller 3 to the fixing nip N by the fixing belt 4. Thereafter, the printing paper is discharged in a discharge tray. Such belt type fixing apparatus is widely used for the color image forming system.

Figure 4:
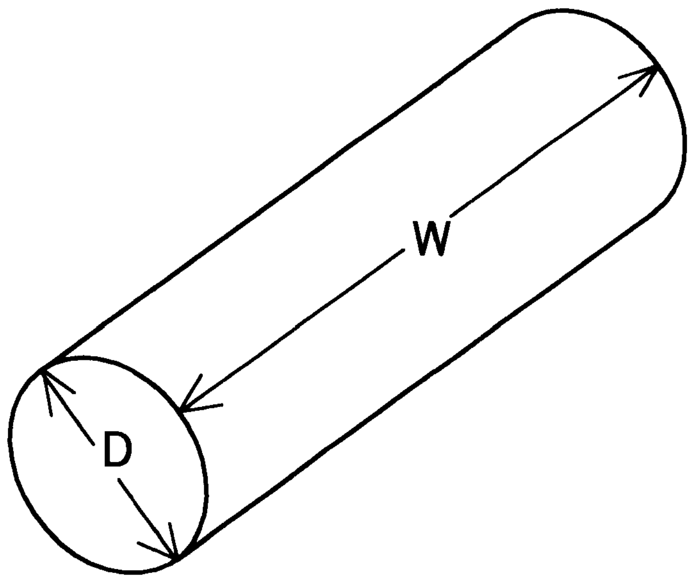
FIG. 4 is a view of an electrocasting master for manufacturing a base material of the fixing belt.

Next, a manufacturing method of base material 9, essential component of the fixing belt 4, will be described. The base material 9 is 173 mm in length of circumference, and 220 mm in length of the axial size, and is manufactured by the publicly known electrocasting technology. First, a master for electrocasting (mold) is prepared. The material thereof is austenite base stainless steel (SUS 304 or the like) and has a cylindrical form (may be hollow) as shown in FIG. 4. Its size is 55 mm in outer diameter (D in the drawing) and 230 mm in length of the axial size (W in the drawing). This master for electrocasting is born by a convenient support, and dipped in an electrocasting electrolytic bath while being rotated around the axis. Further, a separately prepared nickel electrode is also dipped in the electrocasting electrolytic bath. Then, the electrolyte is agitated keeping the bath temperature within a fixed range, and the master for electrocasting is made to be continuously supplied with fresh electrolyte through a filter.

In this state, electricity is supplied so that the master for electrocasting becomes the cathode and the electrode the anode, for depositing electrocast nickel foil on the master for electrocasting. The electrocast nickel foil thus obtained will have flexibility and an appropriate strength if it is about 10 to 100 $\mu$m in thickness. This electrocast nickel foil constitutes the base material 9 of the fixing belt 4. When an electrocast nickel foil of necessary thickness is obtained, the electricity is turned off, and it is lifted up from the electrocasting electrolytic bath together with the master for electrocasting. Then, it is cooled down slightly by dipping in water colder than the bath temperature by about 5 to 15° C. As the electrocast nickel foil sticks weakly to the stainless steel, it comes off the master for electrocasting easily by the difference of heat contraction by the cooling, and it can be extracted. Thus, a flexible and seamless base material 9 can be obtained. The outer surface of this base material 9 is coated with the releasing layer 10 to obtain the fixing belt 4.

TABLE 1

| | Present embodiment | Comparative example |
|---|---|---|
| Bath composition | | |
| Nickel sulfamate (g/l) | 450–900 | 220–450 |
| Boracic acid (g/l) | 20 | 40 |
| Relaxant (ppm) | 10–100 | 10–100 |
| Bath temperature (° C.) | 40 ± 1 | 50 ± 1 |
| Current density (A/$m^2$, on master) | 100–500 | 100–1500 |

Here, electrocasting conditions for obtaining a high fatigue resistance base material 9 are shown with those for Comparative example in Table 1. Saccharin sodium was used as relaxant. However, in addition to this, naphthalene sodium disulfonate, paratoluene sulfonamide, benzene sodium dislfonate, or the like can be used. In Table 1, both the bath temperature and current density are lower in the present embodiment than Comparative example. Namely, reaction conditions being attenuated, electrocast nickel is made to deposit smoothly. In addition, nickel ion concentration is increased to prevent hydrogen atom or other foreign matters from entering. This intends to deposit nickel metal crystal with less lattice defect and higher uniformity.

Figure 5:
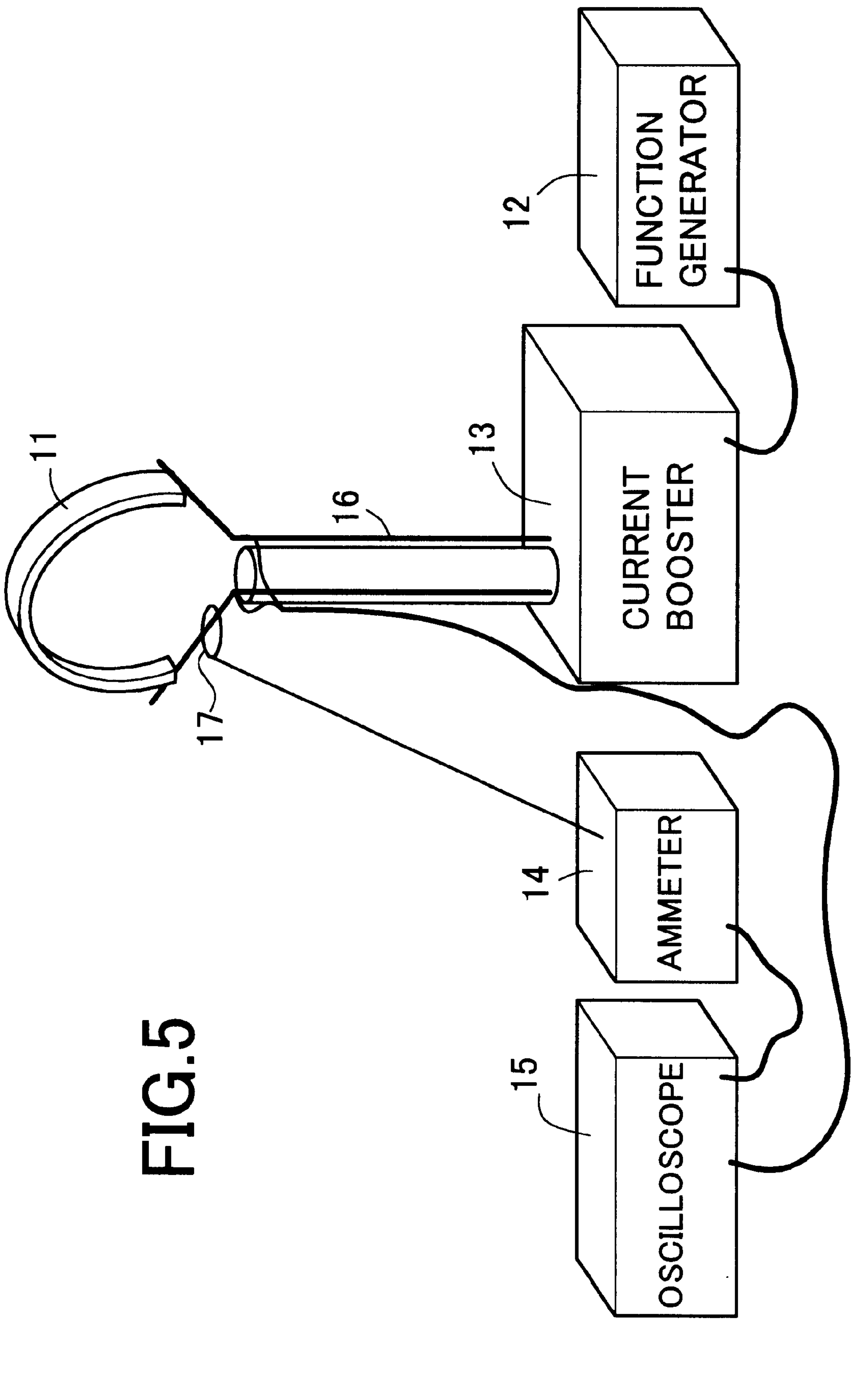
FIG. 5 is a view of a measuring apparatus of high frequency characteristics for evaluating fatigue resistance.
Figure 6:
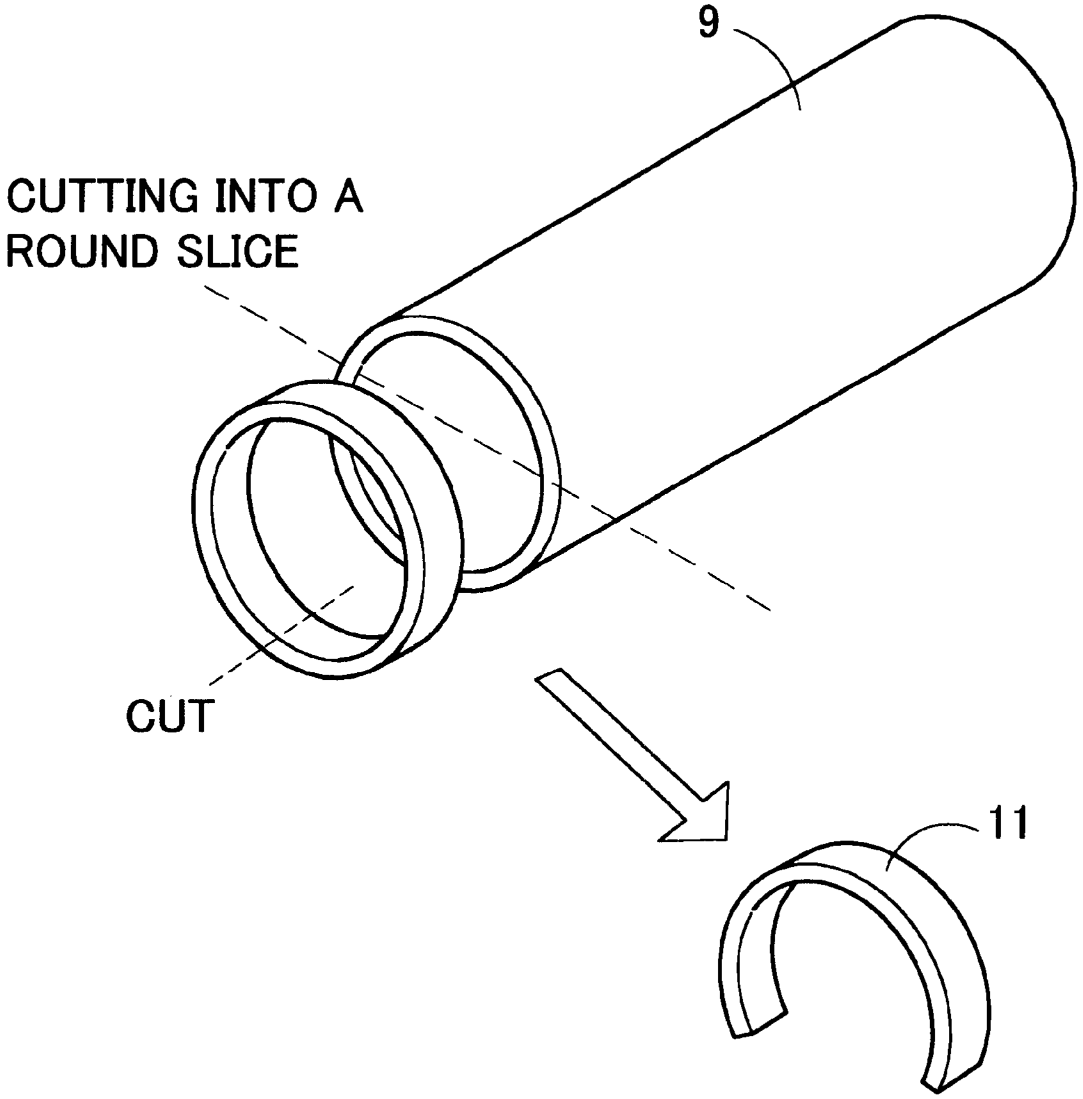
FIG. 6 is a view illustrating the cutting-out of test piece from the base material.

Next, the fatigue resistance evaluation of the base material 9 by measuring the high frequency characteristics will be described. The high frequency characteristics is measured by an apparatus shown in FIG. 5. This apparatus comprises a function generator 12 (for example, "FG-273" made by Kenwood) as signal source, a current booster 13 (for example "4025" made by NF Circuit) for actually applying a signal to the test piece 11, an ammeter 14 (for example, "AM503B" made by Techtronics), and an oscilloscope 15 (for example, "DL1540" made by YOKOGAWA). Both ends of the current booster 13 and the test piece 11 are connected by a coaxial cable 16. The ammeter 14 monitors the current through the test piece 11 by a current probe 17 (for example, "A6302" made by Techtornics). Measurement values of the ammeter 14 and the voltage value between both ends of the test piece 11 are input to the oscilloscope 15. The test piece 11 in FIG. 5 is obtained by cutting the base material 9 in a round slice of an appropriate width, and cutting it at one point into a strip, as shown in FIG. 6.

Figure 7:
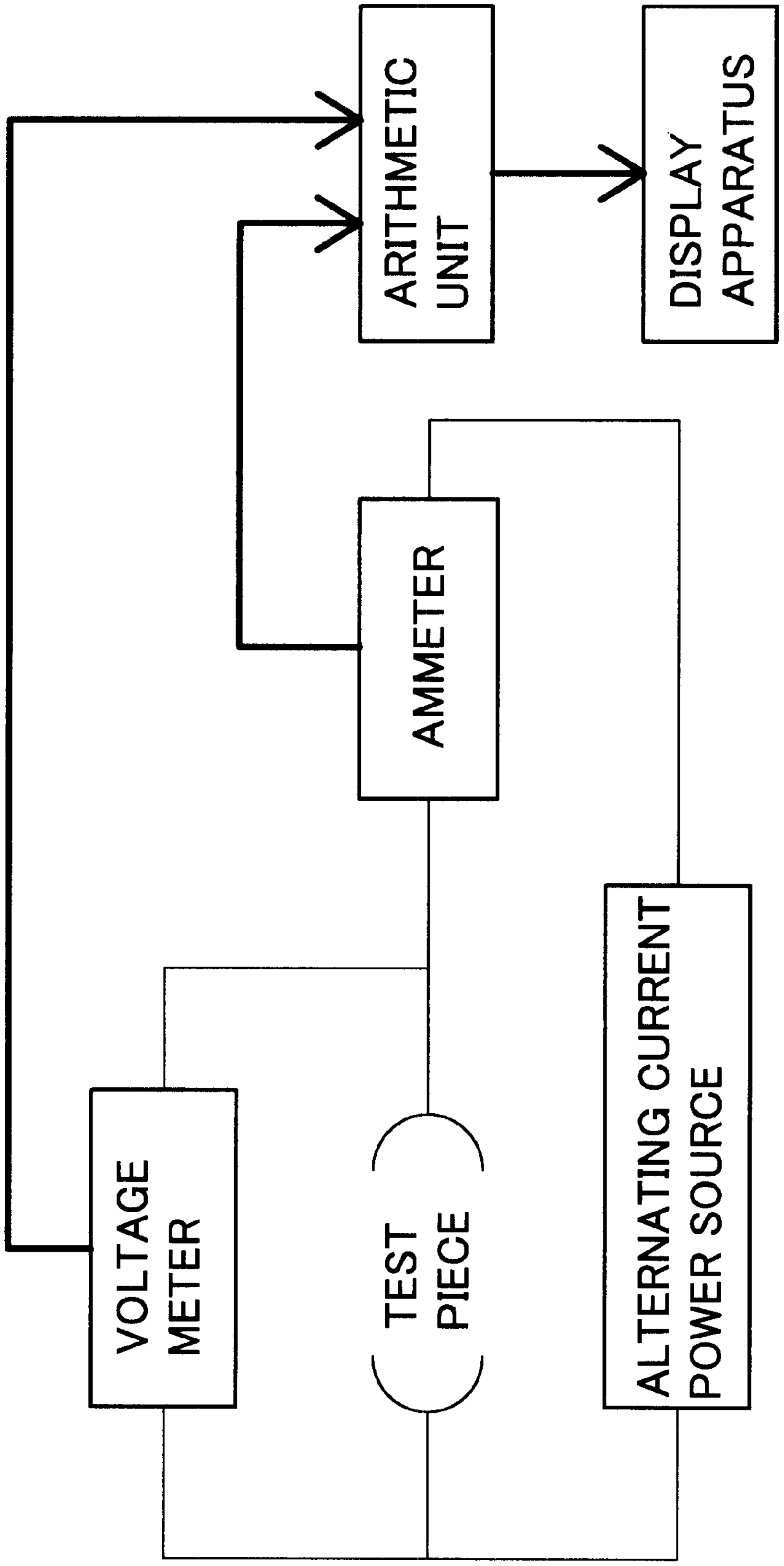
FIG. 7 is a block diagram illustrating the function of the measuring apparatus of FIG. 5.

The function of this apparatus can be represented by the block composition diagram of FIG. 7. In FIG. 7, the "alternating power source" includes the function generator 12 and the current booster 13 of FIG. 5. In addition, the "voltage meter," "arithmetic unit," and "display apparatus" in FIG. 7 compose the oscilloscope 15 in FIG. 5. In the apparatus shown in FIG. 5 and FIG. 7, the voltage and frequency of the alternating power source can be modified. Especially, the frequency can cover a range of 50 Hz to 100 kHz. In addition, it is preferable to have a current limitation function, for the case of abnormally low resistance of the test piece 11. The measurement by this apparatus is performed with both ends of the test piece 11 soldered to each single wire of the coaxial cable 16. Besides, the measurement by this apparatus is not limited to a sheet shape object like the test piece 11, but can be applied to any object of any shape.

Figure 8:
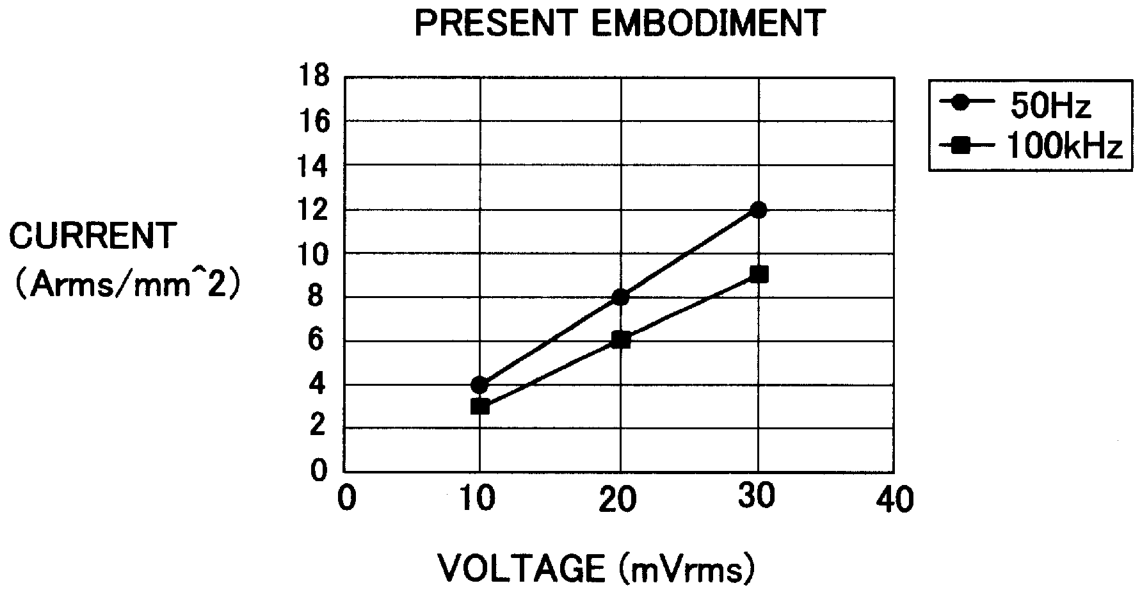
FIG. 8 is a graph showing the voltage-current characteristics of the base material of the present embodiment.
Figure 9:
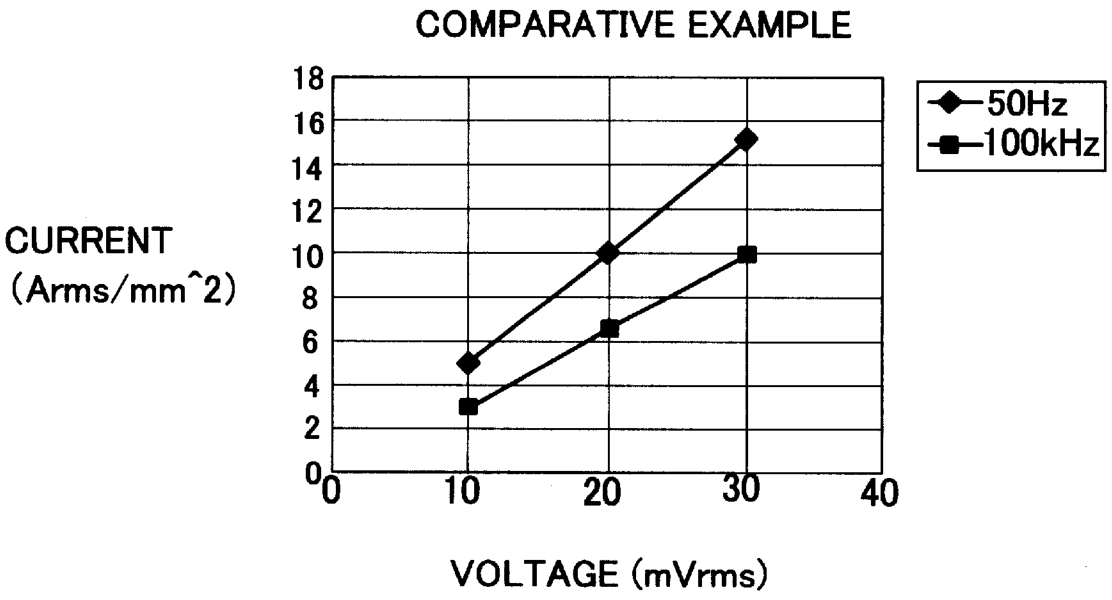
FIG. 9 is a graph showing the voltage-current characteristics of the base material of comparative example.
Figure 10:
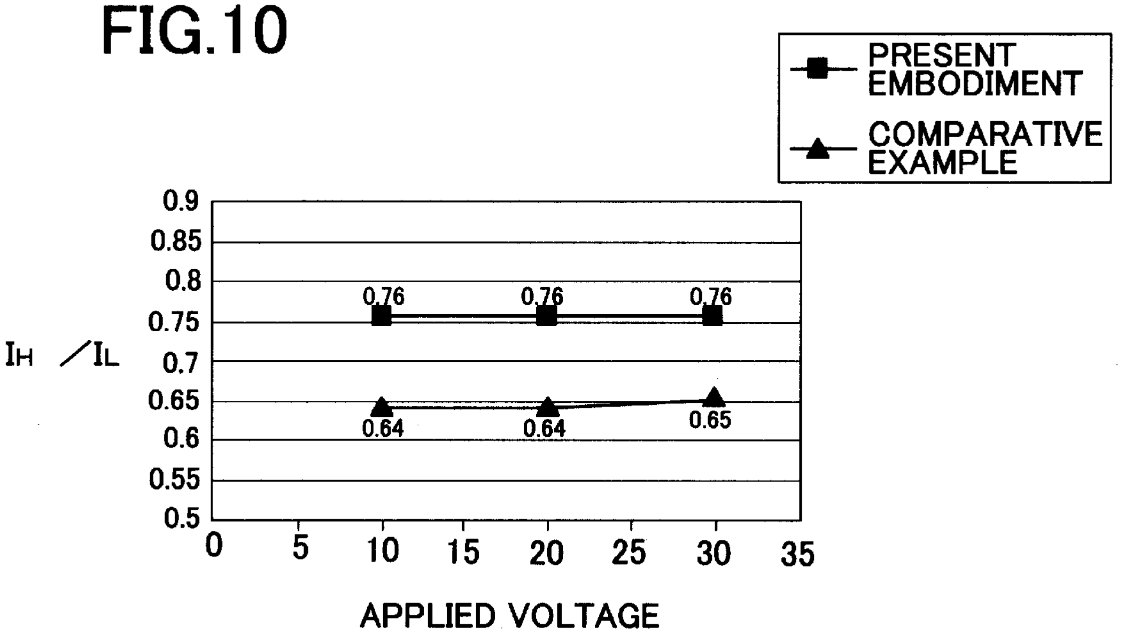
FIG. 10 is a graph showing the relation between applied voltage and $I_H/I_L$.

First, the voltage-current characteristics of the test piece 11 are measured. Namely, as shown in the graph of FIG. 8, three levels of alternating current, 10 mV, 20 mV and 30 mV (effective voltages, respectively) are applied to the test piece 11 at two levels of frequency, 50 Hz and 100 kHz, and the current density (effective value) for each case was measured. The current density is obtained by dividing the measured value of the ammeter 14 by the cross-section area of the test piece 11. The measurement was performed similarly for the test piece of Comparative example (FIG. 9). The current density ratio of respective points in FIG. 8 and FIG. 9, represented by $I_H$ (100 kHz) and $I_L$ (50 Hz) are plotted in FIG. 10 in function of applied voltage. In FIG. 10, the value of $I_H/I_L$ is substantially constant for the applied voltage in both cases of the present embodiment and Comparative example. However, the present embodiment shows a higher value. It is presumed that, in the present embodiment, conductive electrons move smoothly due to a good crystallinity of electrocast nickel as mentioned above, and they can follow easily even a high frequency.

Figure 11:
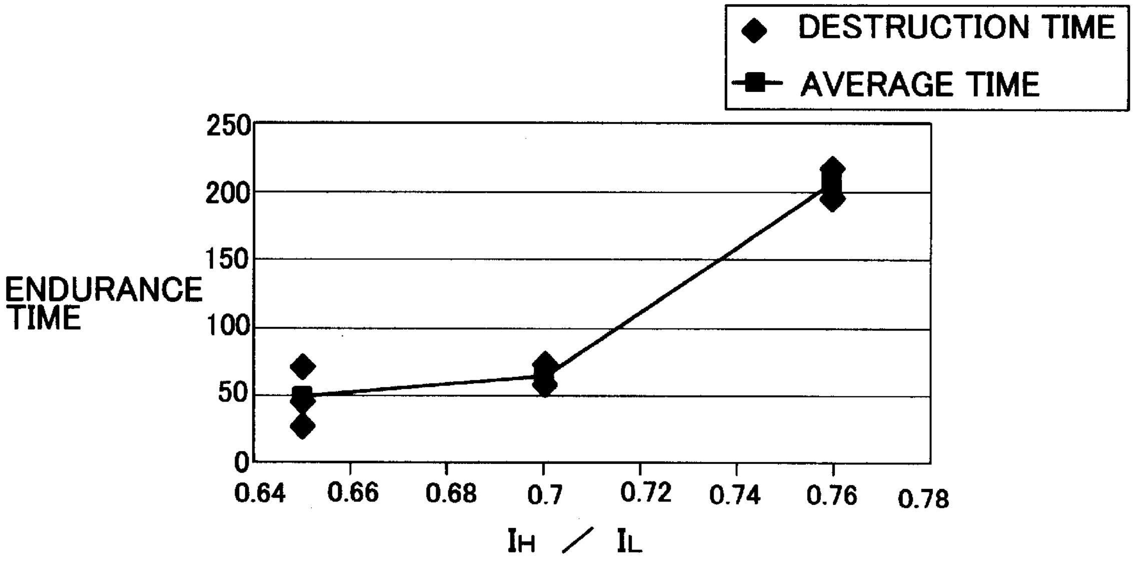
FIG. 11 is a graph showing the relation between $I_H/I_L$ and the endurance time.

Therefore, taking account of $I_H/I_L$ value, base materials with different $I_H/I_L$ values were prepared, and an endurance test of the fixing belt using the same was performed. The $I_H/I_L$ value of the base metal was set to three levels including 0.65 and 0.70 (for Comparative example), and 0.76 (present embodiment), and three test pieces for each level (in total 9 pieces) were prepared and subjected to the test, and time until the destruction of the fixing belt was measured. The graph of FIG. 11 shows the test results. This test was performed under relatively hard conditions (total pressure to the nip section 390N, belt surface temperature 195° C., belt running speed 480 mm/sec, no oil application, and no paper feeding) for acceleration. As shown in FIG. 11, the present embodiment ($I_H/I_L$=0.76) takes times nearly four times that in Comparative example ($I_H/I_L$=0.65, 0.70) before destruction. Namely, it presents an excellent endurance. It is presumed that, in the present embodiment, the base material shows a better fatigue resistance, given a better electrocast nickel crystallinity, as mentioned above.

As the result of further accumulation of test results by the inventor, it was found that the $I_H/I_L$ value range necessary for a good endurance was:

$$0.7<I_H/I_L\leqq 1.$$

More preferably, it was:

$$0.76\leqq I_H/I_L\leqq 1.$$

Next, an impedance of the test piece of the present embodiment and that of the test piece of Comparative example were compared. In short, the impedance $Z_L$, $Z_H$ of the respective test pieces used for the measurement in FIG. 8 to FIG. 10 were read by the oscilloscope 15 with the electricity supplied. Table 2 shows the results thereof. As shown in Table 2, the present embodiment present a higher $Z_L/Z_H$ value than Comparative example. It is presumed that, in the present embodiment, conductive electrons move smoothly due to a good crystallinity of electrocast nickel as mentioned above, and that the impedance difference is small for the high frequency and for the low frequency.

TABLE 2

| | Present embodiment | Comparative example |
|---|---|---|
| Impedance for 50 Hz ($Z_L$) | 67.4 Ω | 50.4 Ω |
| Impedance for 100 kHz ($Z_H$) | 220.0 Ω | 222.4 Ω |
| $Z_L/Z_H$ | 0.306 | 0.227 |

Figure 12:
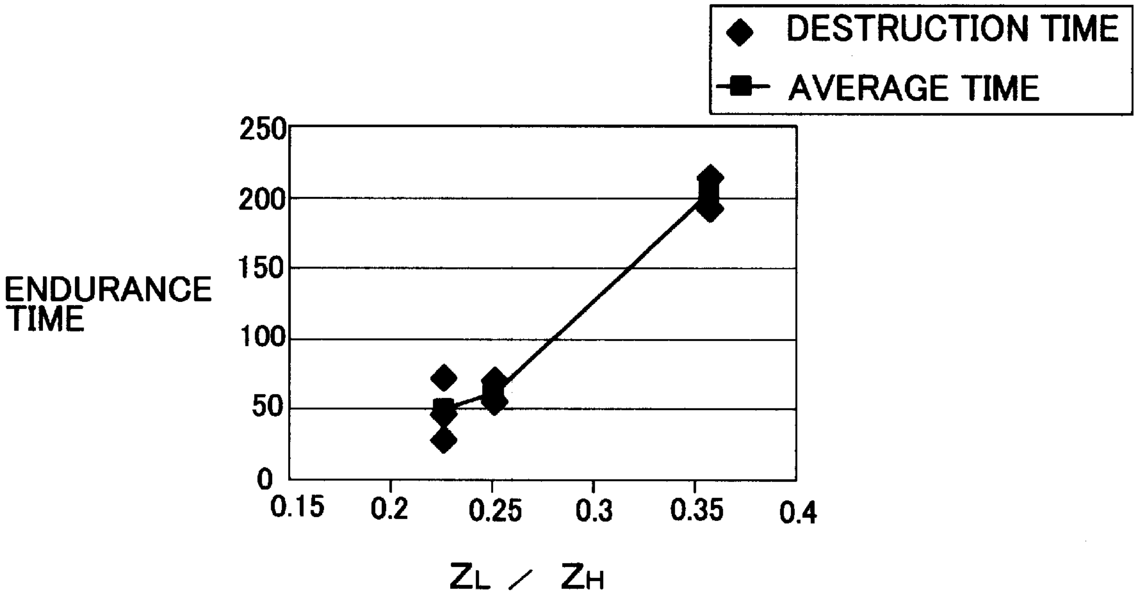
FIG. 12 is a graph showing the relation between $Z_L/Z_H$ and an endurance time.

Therefore, taking account of $Z_L/Z_H$ value, base materials of different $Z_L/Z_H$ value were prepared, and an endurance test of the fixing belt using the same was performed as mentioned above. The $Z_L/Z_H$ value of the base metal was set to three levels, 0.227 and 0.25 (for Comparative example), and 0.35 (present embodiment), and three test pieces for each level (in total 9 pieces) were prepared and subjected to the test, and time until the destruction of the fixing belt was measured. The graph of FIG. 12 shows the test results. As shown,in FIG. 12, the present embodiment ($Z_L/Z_H$=0.35) takes time nearly four times that in Comparative example ($Z_L/Z_H$=0.227, 0.25) before destruction. Namely, it presents an excellent endurance. It is presumed that, in the present embodiment, the base material shows a better fatigue resistance, given a better electrocast nickel crystallinity, as mentioned above.

As the result of further accumulation of test results by the inventor, it was found that the $Z_L/Z_H$ value range necessary for a good endurance was:

$$0.25<Z_L/Z_H<1.$$

More preferably, it was:

$$0.30\leqq Z_L/Z_H\leqq 1.$$

Still more preferably, it was:

$$0.35\leqq Z_L/Z_H\leqq 1.$$

Figure 13:
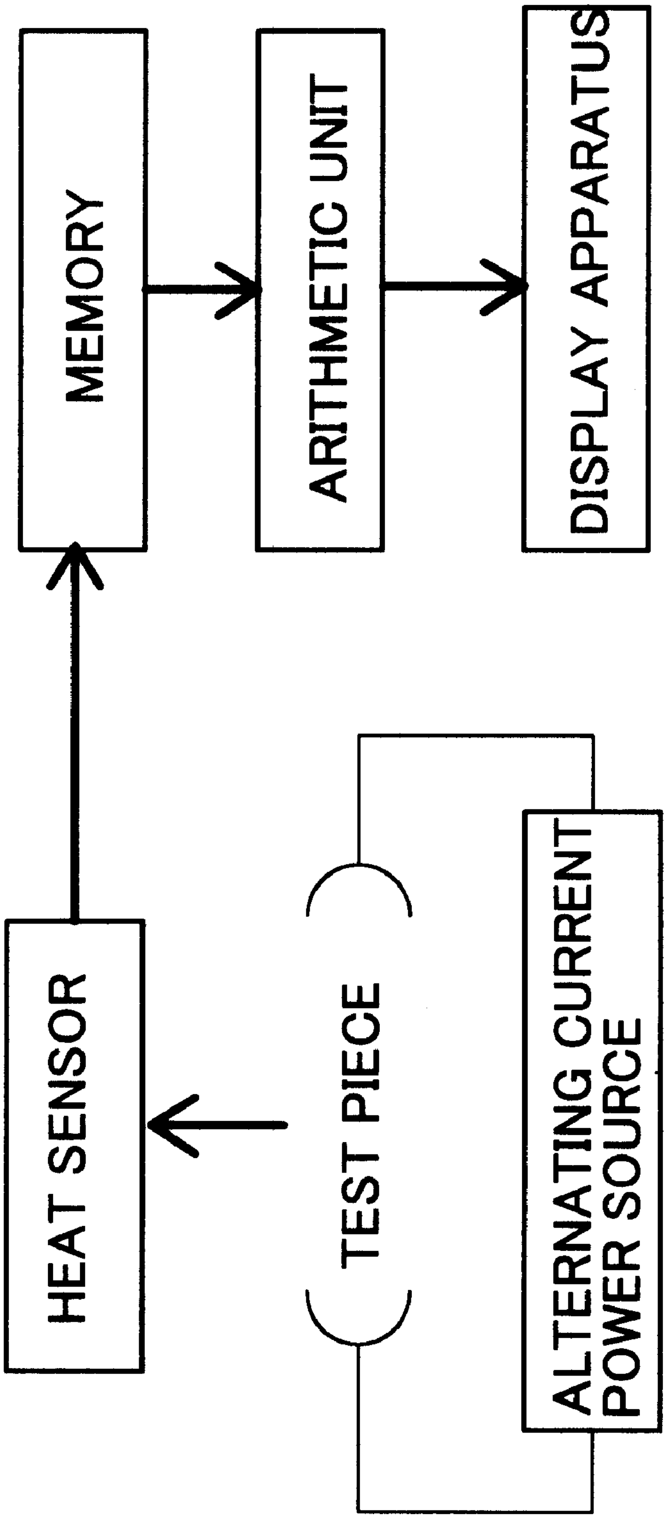
FIG. 13 is a block diagram of a measuring apparatus for calorific measurement.

Next, the calorific characteristics of the test piece of the present embodiment and the test piece of Comparative example were compared. In short, the calorific power of respective test pieces used for the measurement in FIG. 8 to FIG. 10 was measured with the electricity supplied. This measurement was performed with the measurement apparatus in FIG. 5 by attaching a thermistor to the test piece. The function of the measurement apparatus during this measurement is shown by the block diagram in FIG. 13. Namely, the thermistor (represented by "Heat sensor" in FIG. 13) output is accumulated in a memory and supplied for the processing by the arithmetic unit and the display apparatus. As the result, the graph in FIG. 14 was obtained for the present embodiment, and the graph in FIG. 15 for Comparative example. Comparing them, it was found that the difference between the cases of 100 kHz and 50 Hz is smaller in the present embodiment in FIG. 14 than Comparative example of FIG. 15. It is presumed that, in the present embodiment, conductive electrons move smoothly due to a good crystallinity of electrocast nickel as mentioned above, and that the current that follows the voltage well flows even with high frequency.

Figure 14:
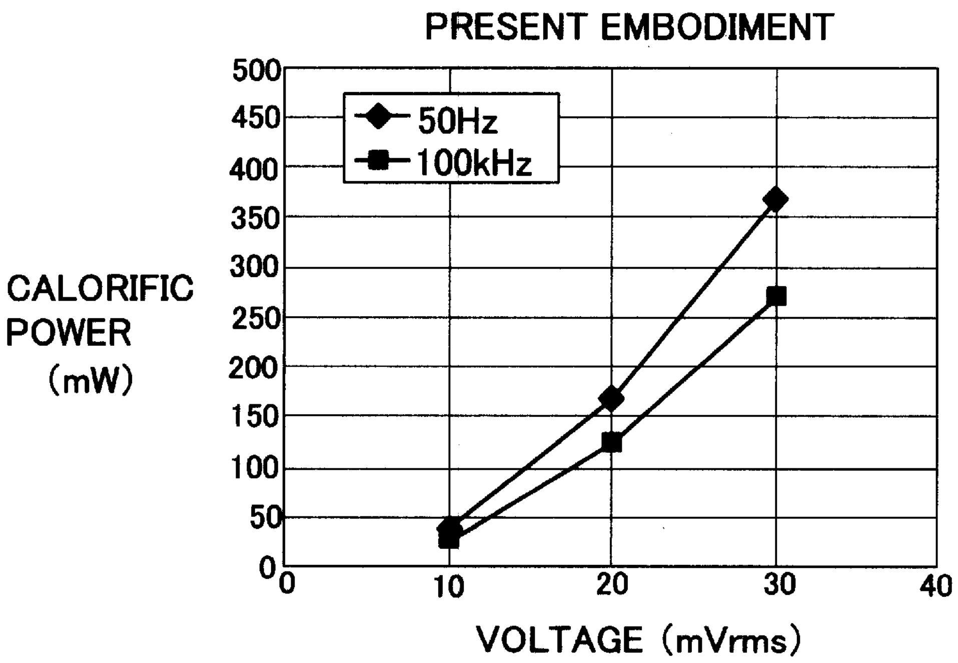
FIG. 14 is a graph showing the calorific characteristics of the base material of the present embodiment.
Figure 15:
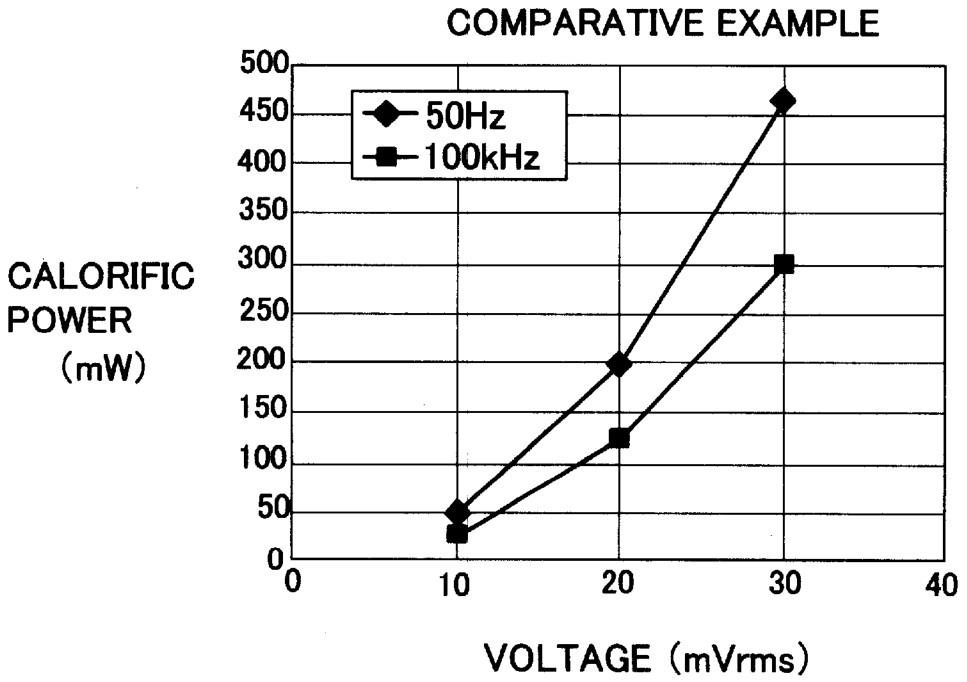
FIG. 15 is a graph showing the calorific characteristics of the base material of comparative example.
Figure 16:
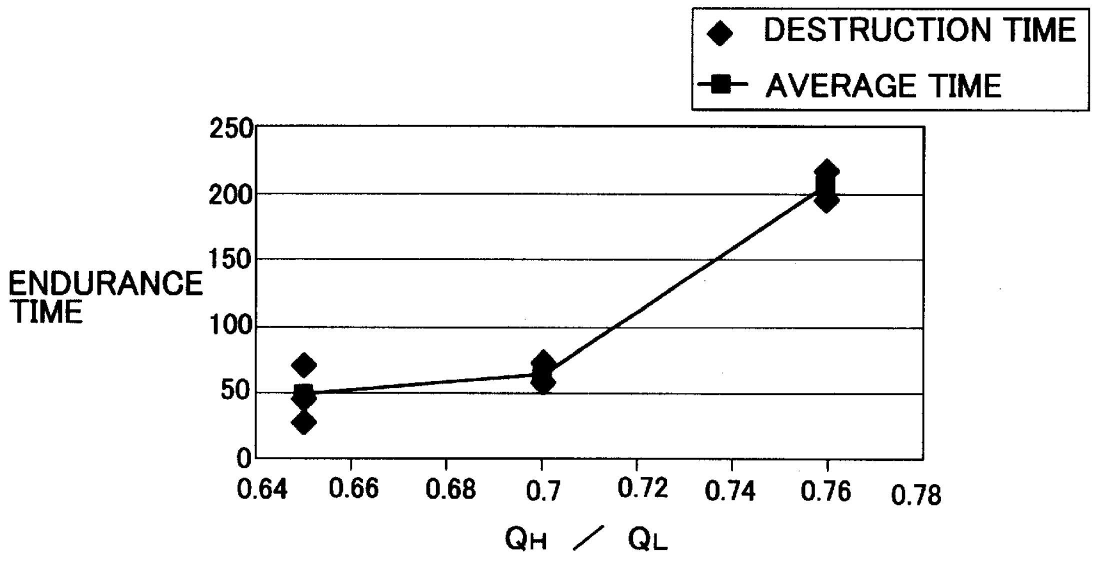
FIG. 16 a graph showing the relation between $Q_H/Q_L$ and the endurance time.

Therefore, taking account of $Q_H/Q_L$ value, when the calorific power values of respective points in FIG. 14 and FIG. 15 are represented by $Q_H$ (100 kHz) and/$Q_L$ (50 Hz) base materials of different $Q_H/Q_L$ value were prepared, and an endurance test of the fixing belt using the same was performed as mentioned above. The $Q_H/Q_L$ value of the base metal was set to three levels, 0.65 and 0.70 (for Comparative example), and 0.76 (present embodiment), and three test pieces for each level (in total 9 pieces) were prepared and subjected to the test, and time until the destruction of the fixing belt was measured. The graph of FIG. 16 shows the test results. As shown in FIG. 16, the present embodiment ($Q_H/Q_L$=0.76) takes time nearly four times that in Comparative example ($Q_H/Q_L$=0.65, 0.70) before destruction. Namely, it presents an excellent endurance. It is presumed that, in the present embodiment, the base material shows a better fatigue resistance, given a better electrocast nickel crystallinity, as mentioned above.

As the result of further accumulation of test results by the inventor, it was found that the $Q_H/Q_L$ value range necessary for a good endurance was:

$$0.7<Q_H/Q_L\leqq 1.$$

More preferably, it was:

$$0.76\leqq Q_H/Q_L\leqq 1.$$

Figure 17:
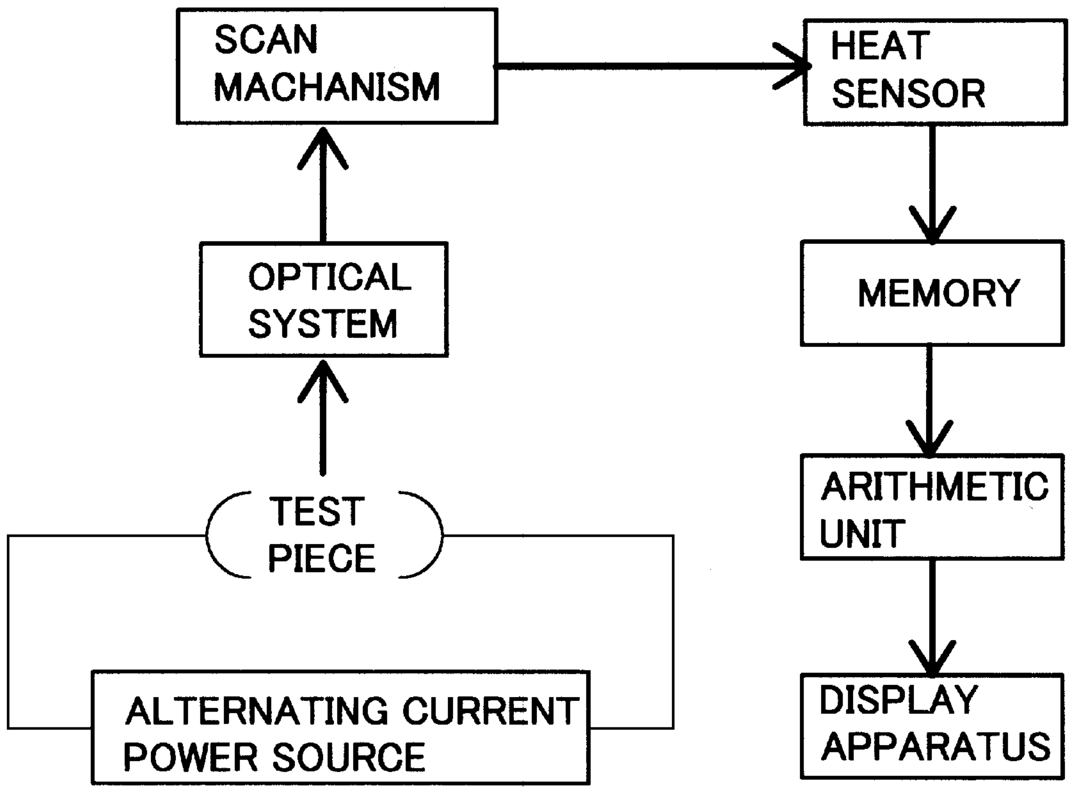
FIG. 17 is a block diagram of the case for performing the calorific measurement for each point and evaluating the measurement.

In the calorific characteristic evaluation shown in FIG. 13 to FIG. 16, only one point of the test piece is measured to represent the entire test piece by the test results thereof. However, in the calorific characteristic evaluation, not only such evaluation, but also evaluation for each point of the test piece is possible. For this purpose, an apparatus with the block composition shown in FIG. 17 is used. In short, the calorific power of each point of the test piece is measured by an optical system and a scan mechanism. Here, the optical path from the heat source to the heat sensor may be different for each point of the test piece. Because, the difference of optical paths is cancelled by the aforementioned evaluation in the form of ratio $Q_H/Q_L$. In this way, if there is a partially lower fatigue resistance point in a single test piece, that point can be identified. It is difficult to imagine a remarkable difference according to the point for the base material 9 of the fixing belt 4 or the like, it is significant to know the difference according to the point for a structural member of a vehicle or the like.

As described in detail hereinabove, according to the present embodiment, an electrocast nickel foil presenting voltage-current characteristics or the like for the high frequency comparable with those for the low frequency is used as the base material 9 of the fixing belt 4. Consequently, the material is highly fatigue resistant, and hard to crack even under repeated deformation, because the electrocast nickel crystallinity is good. Therefore, the life of the fixing belt 4 is sufficiently long. As a result, a fixing belt 4 appropriate for an image forming apparatus of high paper feed speed or an image forming apparatus responding to a wide printing paper is realized. Moreover, basically, as it can be manufactured by a nickel electrocasting process substantially similar to the case of conventional products, the production process will not be complicated.

Further, in the present embodiment, an apparatus for applying an alternating current voltage to the test piece by the function generator 12 and the current booster 13, and measuring the current running through the test piece at that time, impedance and calorific power is used. And, alternating current voltage of two different frequencies are applied to the test piece with this apparatus, to compare several characteristics for the low frequency and the high frequency. Thereby, an apparatus and a method for evaluating by electrically measuring the test piece fatigue resistance is achieved. Non destructive evaluation is also possible depending on the shape of the object to be tested. Especially, the evaluation by calorific power allows to evaluate the fatigue resistance of a specific point of the test piece, and therefore, to know the difference of fatigue resistance for each point.

Note that the present embodiment is for illustration only, and does not limit the scope of the present invention in any way. Consequently, the present invention can be improved and modified without departing from its subject matter. For example, the metal sheet of the present invention can be applied to applications other than the fixing belt, and its material is not limited to nickel, and other metals may be used. Such materials include aluminum, titanium, chromium, molybdenum, tungsten, nickel-cobalt alloy, nickel-cobalt-iron alloy, brass, iron-chromium-nickel ally, and the like. Besides, it may by formed by a process other than the electrocasting, and even for the case of electrocast nickel, the bath composition may be different.

In addition, the evaluation apparatus or the evaluation method shown in FIG. 5 and others can be applied to the test piece of other shape than sheet form, provided that it is a conductive material. Moreover, the frequency for the measurement may be other value than the aforementioned one. In general, it is preferable that the frequency difference is large between the low frequency side and the high frequency side. According to the study of the inventor, the threshold where the voltage-current characteristics are remarkably different according to the frequency in the case of a low fatigue resistance metal material is located somewhere within the range of 100 Hz to 50 kHz. However, it can not be located exactly, because it depends also on the measuring conditions including the connection status with measuring instruments. As the result, as mentioned above, the characteristics superior and inferior to the threshold can be measured, by measuring with two frequencies of 50 Hz and 100 kHz. Therefore, a metal material can be regarded to be excellent as a high fatigue resistance metal sheet, if it satisfies at least one of relations mentioned above under these measurement conditions. Here, an excessively high frequency for the high frequency side is not preferable, because the effect of soldering at the junction with the coaxial cable 16 largely influences the measurement results.

What is claimed is:

1. A flexible metal sheet with high fatigue resistance, satisfying at least one of the following three expressions:

$$0.7<I_H/I_L\leqq 1 \quad (1)$$

$$0.25<Z_L/Z_H\leqq 1 \quad (2)$$

$$0.7<Q_H/Q_L\leqq 1 \quad (3)$$

when a first alternating voltage is applied and when a second alternating voltage having the same effective voltage value as the effective voltage value of the first alternating voltage and having higher frequency than the frequency of the first alternating voltage is applied, wherein respectively $I_L$ represent an effective value of current density when the first alternating voltage is applied;

$I^H$, an effective value of current density when the second alternating voltage is applied;

$Z_L$, an impedance when the first alternating voltage is applied;

$Z_H$, an impedance when the second alternating voltage is applied;

$Q_L$, a calorific power when the first alternating voltage is applied; and $Q_H$, a calorific power when the second alternating voltage is applied.

2. The high fatigue resistance metal sheet of claim 1, satisfying at least one of the following three expressions:

$$0.76\leqq I_H/I_L\leqq 1 \quad (1)'$$

$$0.30\leqq Z_L/Z_H\leqq 1 \quad (2)'$$

$$0.76\leqq Q_H/Q_L\leqq 1 \quad (3)'$$

when a first alternating voltage is applied, and when second alternating voltage is applied.

3. The high fatigue resistance metal sheet of claim 1, satisfying the following expression (2)":

$$0.35\leqq Z_L/Z_H\leqq 1 \quad (2)''$$

when a first alternating voltage is applied, and when second alternating voltage is applied.

4. The high fatigue resistance metal sheet of claim 1, wherein the frequency of the first alternating voltage is 50 Hz, and the frequency of the second alternating voltage is 100 kHz.

5. The high fatigue resistance metal sheet of claim 1, satisfying all the aforementioned expressions (1) to (3), when the first alternating voltage is applied and when the second alternating voltage is applied.

6. The high fatigue resistance metal sheet of claim 1, which is an electrocast nickel of 100 $\mu$m or less in thickness.

7. An endless belt shape fixing belt, comprising:

an endless belt shape metal sheet; and a releasing layer formed on the outer surface of said metal sheet, wherein said metal sheet satisfies at least one of the following expressions:

$$0.7<I_H/I_L\leqq 1 \quad (1)$$

$$0.25<Z_L/Z_H\leqq 1 \quad (2)$$

$$0.7<Q_H/Q_L\leqq 1 \quad (3)$$

when a first alternating voltage is applied and when a second alternating voltage having the same effective voltage value as the effective voltage value of the first alternating voltage and having higher frequency than the frequency of the first alternating voltage is applied, wherein respectively $I_L$ represent an effective value of current density when the first alternating voltage is applied;

$I_H$, an effective value of current density when the second alternating voltage is applied;

$Z_L$, an impedance when the first alternating voltage is applied;

$Z_H$, an impedance when the second alternating voltage is applied;

$Q_L$, a calorific power when the first alternating voltage is applied; and $Q_H$, a calorific power when the second alternating voltage is applied.

8. The fixing belt of claim 7, wherein said metal sheet satisfies at least one of the following three expressions:

$$0.76\leqq I_H/I_L\leqq 1 \quad (1)'$$

$$0.30\leqq Z_L/Z_H\leqq 1 \quad (2)'$$

$$0.76\leqq Q_H/Q_L\leqq 1 \quad (3)'$$

when the first alternating voltage is applied and when the second alternating voltage is applied.

9. The fixing belt of claim 7, wherein said metal sheet satisfies the following expression (2)":

$$0.35\leqq Z_L/Z_H\leqq 1 \quad (2)''$$

when the first alternating voltage is applied and when the second alternating voltage is applied.

10. The fixing belt of claim 7, wherein:

the frequency of the first alternating voltage is 50 Hz, and the frequency of the second alternating voltage is 100 kHz.

11. The fixing belt of claim 7, satisfying all the aforementioned expressions (1) to (3), when the first alternating voltage is applied and when the second alternating voltage is applied.

12. The fixing belt of claim 7, wherein said metal sheet is 100 $\mu$m or less in thickness.

13. The fixing belt of claim 7, wherein said metal sheet is an electrocast nickel.

14. An fixing apparatus comprising:

a first roller;

a second roller;

a fixing belt including an endless belt shape metal sheet and a releasing layer formed on the outer surface thereof and that is wound around the first roller and the second roller; and a third roller disposed in a way to be pressed against the first roller via the fixing belt, wherein the metal sheet satisfies at least one of the following expressions:

$$0.7<I_H/I_L\leqq 1 \quad (1)$$

$$0.25<Z_L/Z_H\leqq 1 \quad (2)$$

$$0.7<Q_H/Q_L\leqq 1 \quad (3)$$

when a first alternating voltage is applied and when a second alternating voltage having the same effective voltage value as the effective voltage value of the first alternating voltage and having higher frequency than the frequency of the first alternating voltage is applied, wherein respectively $I_L$ represent an effective value of current density when the first alternating voltage is applied;

$I_H$, an effective value of current density when the second alternating voltage is applied;

$Z_L$, an impedance when the first alternating voltage is applied;

$Z_H$, an impedance when the second alternating voltage is applied;

$Q_L$, a calorific power when the first alternating voltage is applied; and $Q_H$, a calorific power when the second alternating voltage is applied.

15. The fixing apparatus of claim 14, wherein said metal sheet satisfies at least one of the following three expressions:

$$0.76\leqq I_H/I_L\leqq 1 \quad (1)'$$

$$0.30\leqq Z_L/Z_H\leqq 1 \quad (2)'$$

$$0.76\leqq Q_H/Q_L\leqq 1 \quad (3)'$$

when the first alternating voltage is applied and when the second alternating voltage is applied.

16. The fixing apparatus of claim 14, satisfying all the aforementioned expressions (1) to (3), when the first alternating voltage is applied and when the second alternating voltage is applied.

* * * * *